United States Patent Office 3,463,794
Patented Aug. 26, 1969

---

3,463,794
2,5-DICHLORO-3,6-DIHYDRAZINOBENZOQUI-NONES AND DERIVATIVES THEREOF
Robert C. Slagel, Burnsville, Minn., assignor to Ashland Oil & Refining Company, Ashland, Ky., a corporation of Kentucky
No Drawing. Filed Feb. 25, 1966, Ser. No. 529,927
Int. Cl. C07c *97/08, 49/64*
U.S. Cl. 260—396                4 Claims

---

ABSTRACT OF THE DISCLOSURE

Dichloro-dihydrazinobenzoquinones and the addition salts thereof with a strong acid having utility as resin intermediates and biocidal agents, respectively, as well as a process for the preparation of such benzoquinones involving the reaction of chloranil with a hydrazine, are disclosed.

---

This invention relates to certain new chlorinated dihydrazinobenzoquinones and derivatives thereof. In another aspect, it relates to processes for the preparation of such compounds.

The chlorinated dihydrazinobenzoquinones of the present invention can be represented by the following formula:

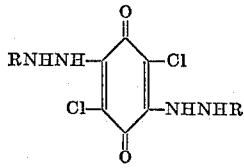

wherein both R's are hydrogen or an alkyl. Such alkyls can have 1 to 18, preferably 1 to 8, carbon atoms each. This invention also encompasses the salts of the compounds of Formula I with strong acids, such as hydrochloric acid and the like.

Compounds of Formula I can be prepared according to one aspect of this invention by reacting one mole of chloranil (tetrachlorobenzoquinone) with at least two moles of a hydrazine compound of the general formula $NH_2NHR$ (where R is as defined above) and then, if desired, treating the resulting salt product (viz, a 2,5-dichloro-3,6-dihydrazinobenzoquinone dihydrochloride) with a base. These reactions can be represented by the following equations:

Equation I

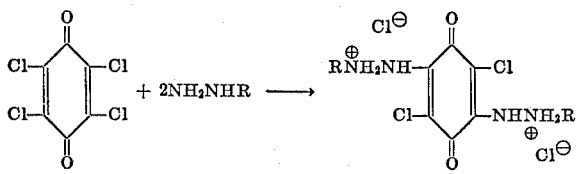

Equation II

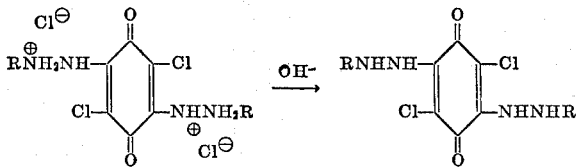

The reaction of Equation I is exothermic and can be carried out at the autogenous temperature or controlled to proceed at temperatures in the range of about 5° to 80° C., ambient or autogenous temperatures being preferred. The reaction is preferably carried out at atmospheric pressure, though higher pressures, such as the autogenous pressure developed in a closed reactor, can be used. In general, especially good yields of the dihydrocholoride salt can be obtained if reaction conditions are maintained for a period of about one hour. Practical yields can be obtained if reaction conditions are maintained for as little as fifteen minutes or as long as two days.

At least two moles of the hydrazine must be used for each mole of chloranil. Higher ratios are preferred for best yields. In general, about 2-5 moles of the hydrazine can be used in the reaction mixture for each mole of chloranil with good results. Higher concentrations of the hydrazine are usable, but not necessary.

Suitable hydrazines for use in the preparation of the compounds of Formula I include hydrazine (or the hydrate thereof) and alkyl-substituted hydrazines such as methyl hydrazine, ethyl hydrazine, propyl hydrazine, hexyl hydrazine, and higher alkyl-substituted hydrazines such as stearyl hydrazine.

In the preferred embodiment, the reaction of Equation I can be carried out by forming two separate solutions of reactants and then mixing these solutions at room temperature. The hydrazine can be dissolved in an inert polar solvent such as a lower alkanol (e.g., methanol, ethanol, propanol, isopropanol, and the like). Usually about one liter of solvent should be employed for each mole of the hydrazine. Chloranil can be pre-dissolved in an inert non-polar solvent of the type represented by benzene, toluene, xylene, or the like. Usually about five liters of the non-polar solvent should be used for each mole of chloranil. It will be understood, of course, that the dihydrochloride product will be obtained even though the reaction is carried out with other than the above-stated quantities of solvent.

When the reaction of Equation I is carried out in a two-solvent system, such as described above, the dihydrochloride is obtained as a precipitate in the reaction mixture. It can be isolated and purified by filtration and recrystallization procedures along conventional lines.

As shown by Equation II, the dihydrochloride can be converted to the free dihydrazino derivative by treatment of the salt with a base such as an alkali metal hydroxide or an alkali metal alcoholate, e.g., sodium hydroxide, sodium methylate, and the like.

The free base can be converted, if desired, to other salts by treating the base with a strong acid corresponding to the desired salt. Such acids representatively include trichloroacetic acid and acids stronger than the latter, e.g., nitric acid, sulfuric acid, phosphoric acid, trifluoroacetic acid, picric acid, benzosulfonic acid, naphthalene sulfonic acid, and the like.

Representative chlorinated dihydrazinobenzoquinones which can be made by this invention as disclosed above include: 2,5-dichloro-3,6-dihydrazinobenzoquinone; 2,5-dichloro-3,6-di(methylhydrazino)benzoquinone; 2,5 - dichloro-3,6-di(ethylhydrazino)benzoquinone; 2,5-dichloro-3,6-di(stearylhydrazino)benzoquinone; and the like. Salts of these chlorinated dihydrazinobenzoquinones representatively include hydrochloride, nitrate, sulfate, trichloroacetate, and the like.

The compounds of Formula I and their salts have biocidal activity and can be used in agriculture for seed protection to control damping-off fungi such as Aphanomyces and Rhizoctonia. Additionally, the compounds of Formula I wherein R is hydrogen (viz, 2,5-dichloro-3,6-dihydrazinobenzoquinone) react with other materials to produce resinous polymers useful in the preparation of coating compositions. Thus, the hydrazines of Formula I can be reacted with acid chlorides to give polymeric hydrazines, or condensed with formaldehyde to give crosslinked glassy resinous polymers. The hydrazines can also be condensed with polyisocyanates such as aryl diisocyanates (e.g., tolylene diisocyanate or phenylene diisocyanate) to give polymeric ureides. The reactivity of the hydrazines of this invention with isocyanates can be employed in a different manner by using the hydrazines as chain extenders in the preparation of polyurethanes. Polyurethane films of good physical properties can be obtained by curing tolylene diisocyanate-polyethylene glycol 400, diphenylmethane diisocyanate-polypropylene glycol 750, and tolylene diisocyanate-tripropylene glycol with the hydrazine compound of Formula I wherein the R's are hydrogen.

The following examples are presented to further illustrate the present invention, but it should be understood that the particular materials and amounts thereof used in these examples, as well as conditions of reaction and other details, should not be construed to unduly limit this invention.

EXAMPLE I

Hydrazine hydrate (23.3 g.; 0.47 mole) in 550 ml. of 95% ethanol was added slowly at room temperature to 24.6 g. (0.1 mole) of chloranil in 550 ml. of benzene. After standing 48 hours, the resulting tan precipitate was filtered and dried giving 29.5 g. of crude product (95.3% yield). Recrystallization from absolute ethanol gave the product as pale tan crystals with M.P. 177.5° C. (dec.). Elemental and infrared analyses of these crystals confirmed the identity of the product as 2,5-dichloro-3,6-dihydrazinobenzoquinone dihydrochloride.

EXAMPLE II 1.87 g. (0.0051 mole) of the dihydrochloride of Example I were placed in 10 ml. of anhydrous methanol. A solution of about 0.3 g. of sodium methylate in 5 ml. of anhydrous methanol was added to the first solution and the mixture then heated on a steam bath for a few minutes. Filtration gave several mg. of NaCl. Cooling of the filtrate precipitated some more NaCl. Finally, after no more NaCl precipitated, the solution was concentrated to give about 1.5 g. of the product as a light brown solid. Infrared analyses of the product confirmed the identity of the compound as 2,5 - dichloro - 3,6 - dihydrazinobenzoquinone.

EXAMPLE III 2,5 - dichloro - 3,6 - di(methylhydrazino)benzoquinone dihydrochloride is obtained by following the procedure of Example I except that methyl hydrazine is substituted for the hydrazine used in Example I.

EXAMPLE IV

To a dry acetone solution of about 100 mg. of the hydrazino compound synthesized above in Example II, were added about 80 mg. of meta-phenylene diisocyanate. The resulting solution was refluxed for 15 minutes and then concentrated to give about 180 mg. of a brown solid which started decomposing at about 195° C. Termination of the isocyanate end groups with refluxing methanol gave a brown solid M.P. (decomposes) at 187° C. established by infrared analysis as a polyureide.

It is evident from the foregoing that the hydrazine derivatives of Formula I react with diisocyanates to form polymeric materials. If, instead of the diisocyanate used in Example IV, a tolylene diisocyanate adduct with polyethylene glycol of molecular weight 400 were used, a polyurethane would be obtained.

Various modifications and alterations of this invention will become apparent to those skilled in the art without departing from the scope and spirit of this invention.

What is claimed is:
1. A compound of the formula:

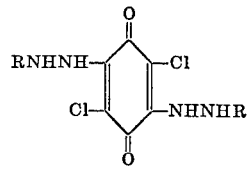

wherein R is hydrogen or alkyl, and the addition salts thereof with an acid selected from the group consisting of hydrochloric, nitric, sulfuric and trichloroacetic.

2. The compounds of claim 1 wherein each R is alkyl.
3. The compound of claim 1 which is 2,5-dichloro-3,6-dihydrazinobenzoquinone dihydrochloride.
4. The compound of claim 1 which is 2,5-dichloro-3,6-dihydrazinobenzoquinone.

References Cited

UNITED STATES PATENTS 3,370,069　2/1968　Winkelmann et al. ____ 260—396

LORRAINE A. WEINBERGER, Primary Examiner

L. ARNOLD THAXTON, Assistant Examiner

U.S. Cl. X.R.

71—123; 260—77.5, 858